(12) United States Patent
Greco et al.

(10) Patent No.: US 7,882,354 B2
(45) Date of Patent: Feb. 1, 2011

(54) USE OF DEVICE DRIVER TO FUNCTION AS A PROXY BETWEEN AN ENCRYPTION CAPABLE TAPE DRIVE AND A KEY MANAGER

(75) Inventors: Paul M. Greco, Tucson, AZ (US); Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 11/470,731

(22) Filed: Sep. 7, 2006

(65) Prior Publication Data

US 2008/0065898 A1 Mar. 13, 2008

(51) Int. Cl.
*H04L 29/06* (2006.01)
*H04L 9/08* (2006.01)

(52) U.S. Cl. ................ 713/165; 713/193; 380/278; 711/4

(58) Field of Classification Search ............. 380/278; 707/204; 711/4; 713/193, 165
See application file for complete search history.

(56) References Cited

U.S. PATENT DOCUMENTS

| 5,899,987 | A | | 5/1999 | Yarom | |
|---|---|---|---|---|---|
| 6,134,660 | A | * | 10/2000 | Boneh et al. | 713/193 |
| 6,249,866 | B1 | * | 6/2001 | Brundrett et al. | 713/165 |
| 6,532,497 | B1 | | 3/2003 | Cromer et al. | |
| 6,999,835 | B2 | | 2/2006 | Kodama | |
| 2002/0188856 | A1 | * | 12/2002 | Worby | 713/193 |
| 2003/0074319 | A1 | | 4/2003 | Jaquette | |

(Continued)

FOREIGN PATENT DOCUMENTS

JP 20040193793 A 8/2004

(Continued)

OTHER PUBLICATIONS

Mazieres, David et al. "Separating key management from file system security", 1999 ACM.*

(Continued)

*Primary Examiner*—Michael J Simitoski
(74) *Attorney, Agent, or Firm*—Hamilton & Terrile, LLP; Stephen A. Terrile

(57) ABSTRACT

A tape system is provided with an encryption capable tape drive and an encryption enabled tape drive device driver for the encryption capable tape drive. The encryption enabled tape drive device driver functions as a proxy which connects the encryption capable tape drive to a key manager which serves keys to the tape drive. When the encryption capable device driver causes a command to be sent to the drive, the tape drive is configured to respond with a message that is intended for a key manager such as an External Key Manager (EKM). The encryption capable device driver recognizes that this is a message intended for the EKM and forwards that message to the EKM (e.g., via an Internet Protocol (IP) connection). The EKM then responds to the key request by issuing a new key (for a new cartridge which is to be written from beginning of tape (BOT)) or an existing key (for a cartridge which needs to be read). The device driver connects all EKM responses to the encryption capable tape drive and the EKM from which the encryption capable tape drive obtains its keys.

18 Claims, 11 Drawing Sheets

U.S. PATENT DOCUMENTS

| | | |
|---|---|---|
| 2003/0084290 A1* | 5/2003 | Murty et al. ............ 713/168 |
| 2003/0196148 A1 | 10/2003 | Harrisville-Wolff et al. |
| 2004/0165304 A1 | 8/2004 | Greco et al. ............ 360/75 |
| 2005/0259816 A1* | 11/2005 | Han et al. ............ 380/44 |
| 2006/0161715 A1 | 7/2006 | Hamaguchi |
| 2007/0005304 A1 | 1/2007 | Celestini |

FOREIGN PATENT DOCUMENTS

| | | |
|---|---|---|
| JP | 2006279243 A | 12/2006 |
| WO | WO 02/29577 A | 4/2002 |
| WO | WO03032133 A2 | 4/2003 |
| WO | WO2007084758 A2 | 7/2007 |

OTHER PUBLICATIONS

International Search Report for PCT/EP2007/058786, dated Oct. 12, 2007.

* cited by examiner

USE OF DEVICE DRIVER TO FUNCTION AS A PROXY BETWEEN AN ENCRYPTION CAPABLE TAPE DRIVE AND A KEY MANAGER

BACKGROUND OF THE INVENTION

1. Field of the Invention

The invention relates in general to tape storage systems and more particularly to the use of a device driver to function as a proxy between an encryption capable tape drive and a key manager.

2. Description of the Related Art

It is known to use high density, removable media storage libraries within a data storage system to provide large quantities of storage in networked computer systems. Typically, such data storage systems are employed for backup or other secondary storage purposes, but the data storage system may also be used as primary storage in circumstances that are conducive to sequential data access and the like. Often the data is stored on media cartridges, such as magnetic tapes or optical disks. Known media cartridges are capable of storing large quantities of data. A storage system may include a plurality of legacy storage devices (i.e., devices which are not specifically designed to work with a more current data storage system.)

It is known for encryption capable drives to obtain keys either in-band (e.g., via a Fiber Channel) from an application or out-of-band (e.g., over an interface with a library (such as a RS-422 interface)). These modes of obtaining keys allow application managed keys and library managed keys, respectively.

However, an issue with encryption capable tape drives relates to when data from legacy applications (i.e., applications which have not been modified to serve keys) is provided to the encryption capable tape drive. An additional issue with encryption capable tape drives relates to when the encryption capable tape drives are located within legacy automated tape libraries (i.e., tape libraries which have not been modified to obtain keys from the drive transparently of the application). In either or both of these situations, the encryption capable tape drive may not able to obtain an encryption key. This issue may also be present in other environments. E.g., if the encryption capable tape drive is in a bridge box or is rack mounted (and thus is not in automation) or if the encryption capable tape drive is in a hostile environment (such as in a silo of a manufacturer other than the manufacturer of the tape drive). It is likely that the hostile environment would not be motivated to enable key passing to the encryption capable tape drive.

In each of these situations, it is desirable to provide the ability to provide keys to the encryption capable tape drive so that encryption can be performed transparently of any application executing within the data storage system.

SUMMARY OF THE INVENTION

In accordance with the present invention, a tape system is provided with an encryption capable tape drive and an encryption enabled tape drive device driver for the encryption capable tape drive. The encryption enabled tape drive device driver functions as a proxy which connects the encryption capable tape drive to a key manager to facilitate encryption operations such as, for example, the key manager serving keys to the tape drive. Thus, the encryption enabled tape drive device driver facilitates encryption independent of whether the host is capable of supporting or performing encryption. In one aspect of the invention, when the encryption capable device driver causes a command (such as a Read or Write command) to be sent to the drive, the tape drive is configured to respond with a message that is intended for a key manager such as an External Key Manager (EKM). The encryption capable device driver recognizes that this is a message intended for the EKM and forwards that message to the EKM (e.g., via an Internet Protocol (IP) connection). The EKM then responds to the key request by issuing a new key (for a new cartridge which is to be written from beginning of tape (BOT)) or an existing key (for a cartridge which needs to be read). The device driver connects all EKM responses to the encryption capable tape drive and the EKM from which the encryption capable tape drive obtains its keys.

In this way, the device driver provides a communications path between the encryption capable tape drive and the EKM from which the encryption capable tape drive is to obtain its keys. Once the tape drive has obtained all keys, the driver proxy can then issue a Command Complete message to the device driver, which then continues processing the host application command and communicates this information back to the host application. Thus, the application data will begin to flow between the drive and the application. (To the tape drive in the case of a write and from the tape drive in the case of a read.) The device driver continues to function as a communication path between the application and the device driver for normal commands. The device driver also detects extended commands intended for the EKM and provides this communication path separately. Thus, the tape system includes an in-band communications path (i.e., a communications path between the device driver and the tape drive) and an out-of-band communications path (i.e., a communications path between the device driver and the EKM).

Accordingly, in one embodiment, the invention relates to a storage system which includes a host, a storage device coupled to the host and a device driver executing on the host. The storage device interacts with storage media to store and retrieve information from the storage media and includes an encryption module which enables encryption and decryption of data stored on storage media. The device driver checks for encryption related information from the storage device. The encryption related information is generated in response to a command issued by the host. When encryption related information is present, the device driver facilitates encryption independent of whether the host is encryption enabled.

In another embodiment, the invention relates to a storage device for interacting with storage media to store and retrieve information from the storage media. The storage device includes an encryption module and a controller coupled to the encryption module. The encryption module enables encryption and decryption of data stored on storage media. The controller interacts with the encryption module to enable storage and retrieval of information to and from the storage media wherein the storage device receives information from and transmits information to a device driver that checks for encryption related information from the storage device. The encryption related information is generated by the storage device in response to a command issued by the host, when encryption related information is present. The device driver facilitates encryption independent of whether the host is encryption enabled.

In another embodiment, the invention relates to a device driver for executing on a host and communicating with a storage device. The device driver includes a command initiation portion which intercepts a command issued by the host to the storage device, a command execution portion which executes the command after an encryption operation has completed execution, and an encryption portion which checks for encryption related information from the storage device wherein the encryption related information is generated by the storage device in response to a command issued by the host. When encryption related information is present, the device driver facilitates encryption independent of whether the host is encryption enabled.

In another embodiment, the invention relates to a method for facilitating encryption between an encryption enabled storage device and a host. The method includes issuing a command to the storage device, intercepting encryption related information generated by the storage device in response to the command, determining whether the encryption related information indicates that an encryption operation is needed to be performed before the command can be executed by the encryption enabled storage device, performing an encryption operation independent of whether the host is encryption enabled when the encryption related information indicates that the encryption operation is needed, and executing the command after the encryption operation has completed execution.

In another embodiment, the invention relates to a storage system. The storage system includes a host a storage device coupled to the host, a module coupled to the storage device and a device driver executing on the host. The storage device interacts with storage media to store and retrieve information from the storage media. The device driver checks for special status information from the storage device which special status information is generated in response to a command issued by the host. When the special status information is present, the device driver facilitates communication independent of whether the host is enabled to communicate with the module.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

In the following description, reference is made to the accompanying drawings which illustrate several embodiments of the present invention. It is understood that other embodiments may be utilized and structural and operational changes may be made without departing from the scope of the present invention.

Figure 1:
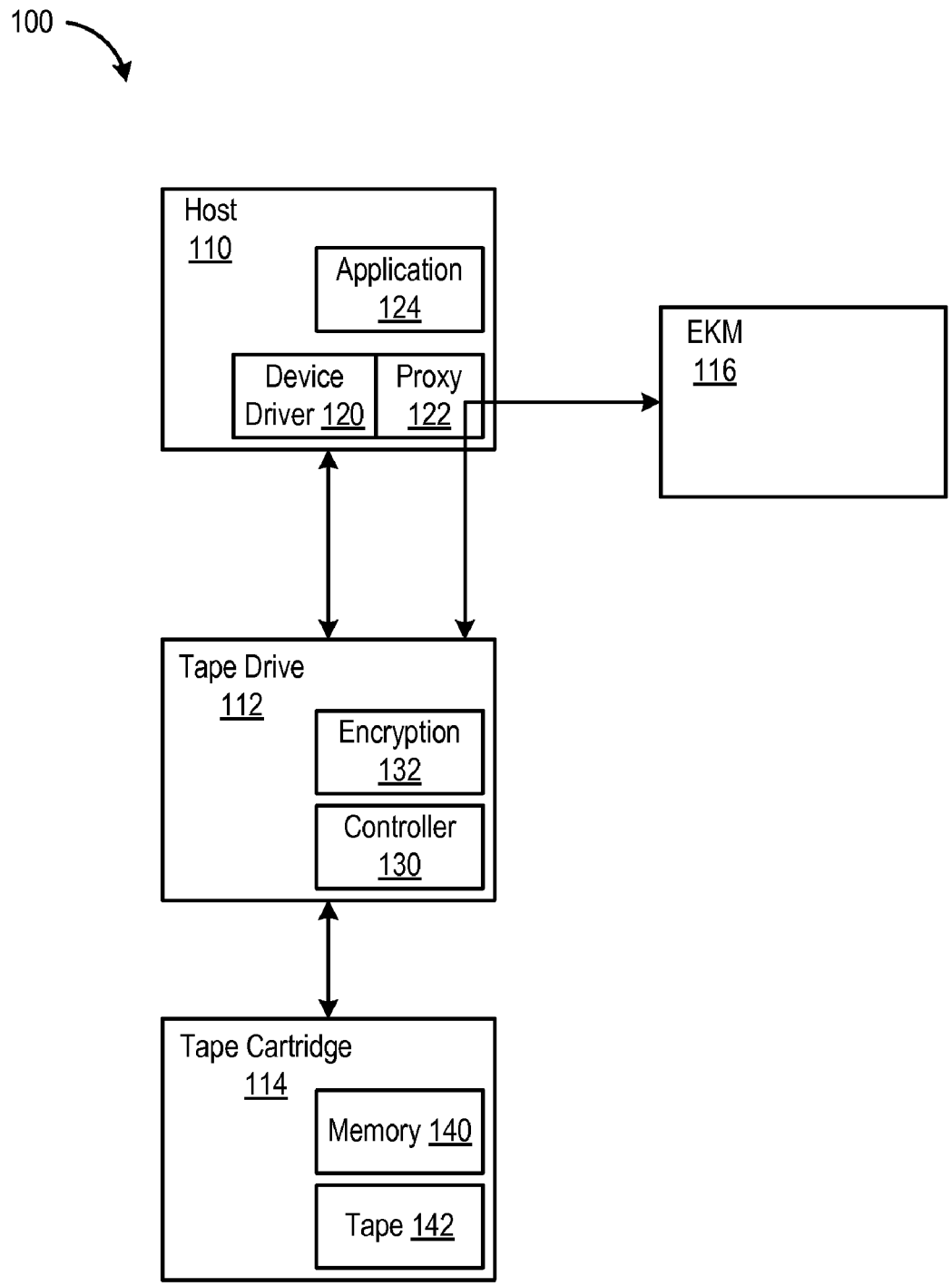
FIG. 1 shows a schematic block diagram illustrating a representative tape storage system.

Referring to FIG. 1, an architecture of a tape storage system 100 in which aspects of the invention are implemented is shown. The tape storage system 100 includes a host 110, a tape drive 112 and a tape cartridge 114. The tape storage system 100 also includes an external key manager (EKM) 116.

The host 110 includes a device driver 120 as well as a proxy 122. The host also includes an application 124. The tape drive includes a controller 130 as well as an encryption module 132. The tape cartridge 114 includes a non-volatile cartridge memory 140 as well as a high capacity magnetic tape 142.

The application 124 may include a backup program, that transfers data to and from the tape drive 112 to sequentially write (or read) the data to and from the tape 142. The application 124 may use SCSI tape commands to communicate I/O request to the tape drive 112. Alternately, the application 124 may use other data access command protocols. To retrieve data, the application 124 may cause the tape 142 to be read either sequentially or in a random manner.

The cartridge memory 140 maintains information about the format and layout of data on the magnetic tape 142. The cartridge memory 140 may also maintain encryption information for encrypting and decrypting the data stored on the magnetic tape 142.

The tape drive 112 includes read/write heads capable of transferring data to and from the magnetic tape 142. The tape drive controller 130 receives input/output (I/O) requests from the host system 110 and is capable of executing the received I/O request by rewinding the tape and positioning the tape heads at a particular location on the magnetic tape 142 using tape drive mechanism and algorithms to estimate a likely location of a file on the tape. The tape drive 112 may be enclosed within the host system 110 or be a stand alone unit or in a tape library. The tape drive 112 may connect with the host via a direct interface (such as SCSI, Fibre Channel, etc.) or connect over a network (such as a Local Area Network (LAN), storage area network (SAN), wide area network (WAN), the Internet, an Intranet, etc.)

The device driver 120 enables the tape system 100 to encrypt and decrypt data on a tape cartridge 142 when the tape drive is encryption capable even if the host 110 or host application 124 is not encryption capable. Thus, the device driver 120 is an encryption enabled tape drive device driver The encryption enabled tape drive device driver provides a proxy function via the proxy 122 proxy which connects the encryption capable tape drive 112 to a key manager 116 which serves keys to the tape drive 112. Thus, the device driver 120 provides a communications path between the encryption capable tape drive 112 and the EKM 116 from which the encryption capable tape drive 112 can obtain keys. The device driver 120 functions as a communication path between the application and the device driver for normal (i.e., non-encryption related) commands. The device driver 120 may also function as the communication path to the tape drive 112 under control of the proxy 122. The device driver 120 also detects extended commands intended for the EKM and provides this communication path separately. Thus, the encryption capable device driver 120 allows the tape system 100 to have an in-band communications path (i.e., a communications path between the device driver and the tape drive) and an out-of-band communications path (i.e., a communications path between the device driver and the EKM).

Figure 2:
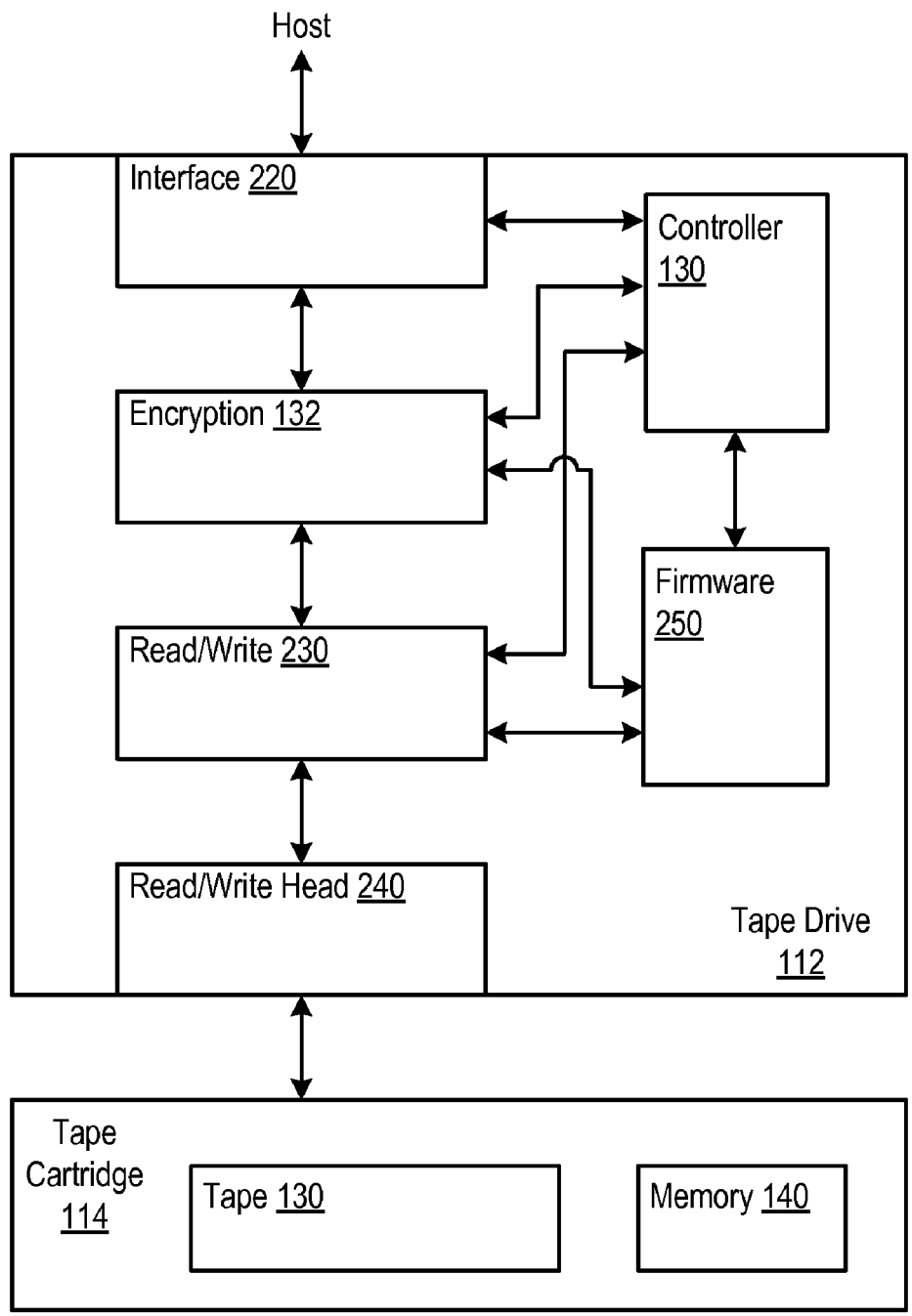
FIG. 2 shows a schematic block diagram illustrating a tape drive and tape cartridge.

FIG. 2 shows a schematic block diagram illustrating the tape drive 112 and tape cartridge 114. The tape drive 112 includes an interface 220, an encryption module 132 (which may be for example an application specific integrated circuit (ASIC)), a read/write system 230, and a read/write head 240. The tape drive 112 also includes firmware 250 which is coupled to the controller 130 and the encryption module 132.

In the illustrated example, the host 110 transfers data to the tape drive 112 to sequentially write to the tape cartridge 114, such as by using the Small Computer System Interface (SCSI) tape commands to communicate I/O requests to the tape drive 112, or any other data access command protocol known in the art.

The tape drive 112 uses the interface 220 to communicate with the host 110. The read/write system 230 interacts with and controls the read/write head 240 for reading information from, and writing information to, the rewritable tape media 130. The read/write system 230 controls the movement of the read write head 240 relative to the magnetic tape media 130 by moving the magnetic tape media 130 across the head 240 at a desired velocity, and stops, starts and reverses the direction of movement of the magnetic tape.

The control system (or controller) 130 in the tape drive 112 communicates with the interface 220, the encryption module 132, and the read/write system 230. To receive commands and exchange information for operating the cartridge handling system 114, the controller 130 also controls the interface 220 to communicate over one or more ports (not shown). The encryption module 132 allows securely encrypting and storing data to the tape cartridge 114 and securely retrieving and decrypting data stored on the tape cartridge 114. In operation, the encryption module 132 performs the actual data encryption and decryption (such as by using the Advanced Encryption Standard encryption algorithm) using a data key having any desired key length (e.g., 128 or 256-bit data key length), and may also perform other encoding functions, such as data compression and decompression and data buffering. The encryption module 132 also controls the data encryption/decryption by assembling validating, distributing, storing and retrieving encryption encapsulated data keys (EEDKs) and by securely exchanging data keys (SEDKs) with the EKM 116 that are associated with the EEDKs for purposes of encrypting and decrypting the data. The encryption module 132 may be implemented with any desired combination of hardware and/or software. For example, the encryption module 132 may be implemented with an ASIC or FPGA circuit which is controlled by and interacts with the firmware 250 and the controller 130.

As described, the tape system 100 performs a variety of functions, including but not limited to, encrypting data to be stored on the cartridge 114 using a data key (such as an AES encryption key); using public key cryptography techniques to wrap the data key with a different key to form one or more encrypted data keys; writing and reading the encrypted data and encrypted data key(s) to and from the tape cartridge media 130; and decrypting the stored encrypted data with the data key that is obtained by unwrapping the encrypted data key. In this way, the tape system 100 provides a distributed key store which permits different users to access the encrypted data on a single tape cartridge 114 by generating separate EEDKs using each user's public key to wrap the data key.

Figure 3:
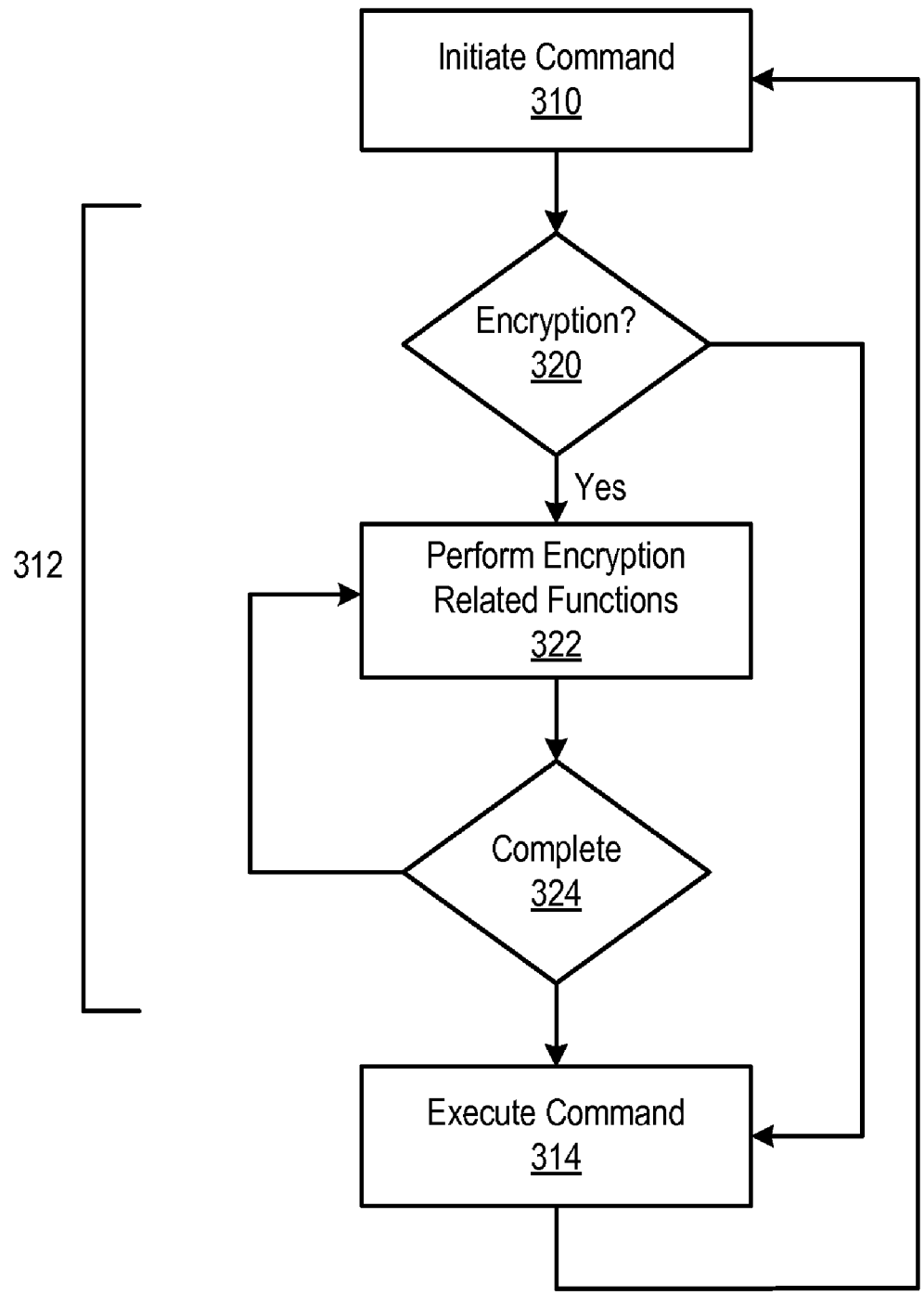
FIG. 3 shows a flow chart of the operation of a tape system when performing an encrypted access.
Figure 4A:
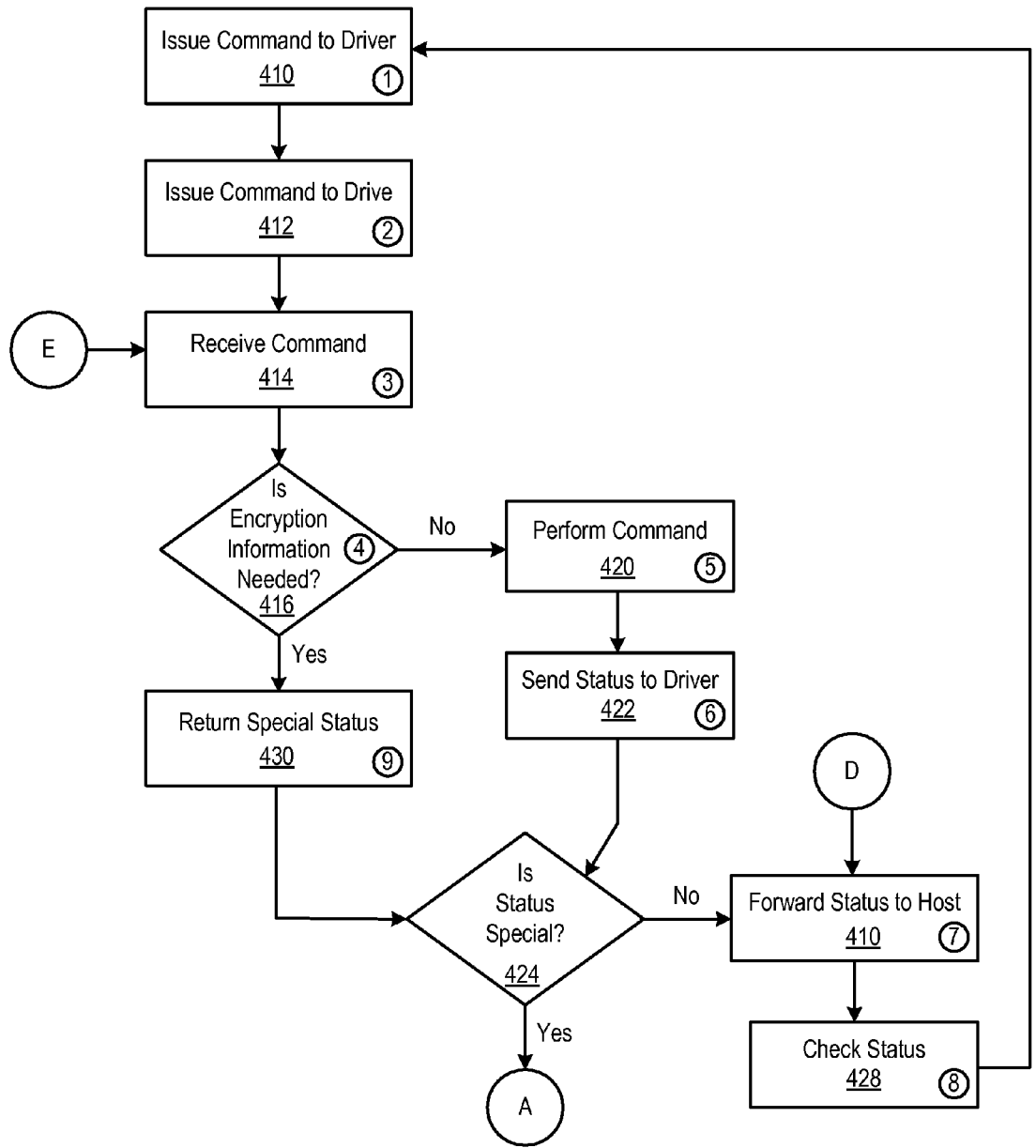
FIGS. 4A-4D, generally referred to as FIG. 4, show a flow chart of the operation of a tape system performing an encrypted access for a key manager pull method.
Figure 4B:
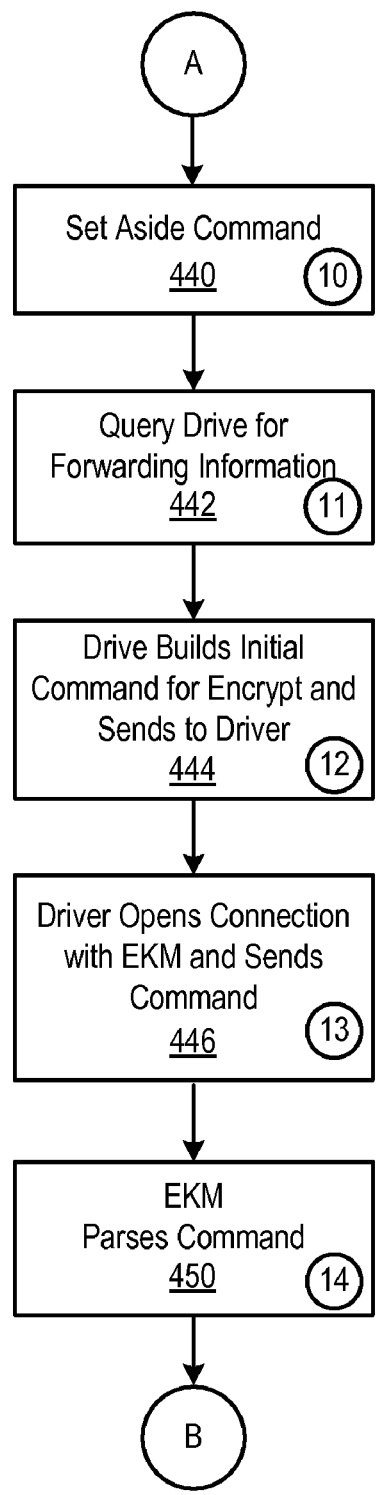
Figure 4C:
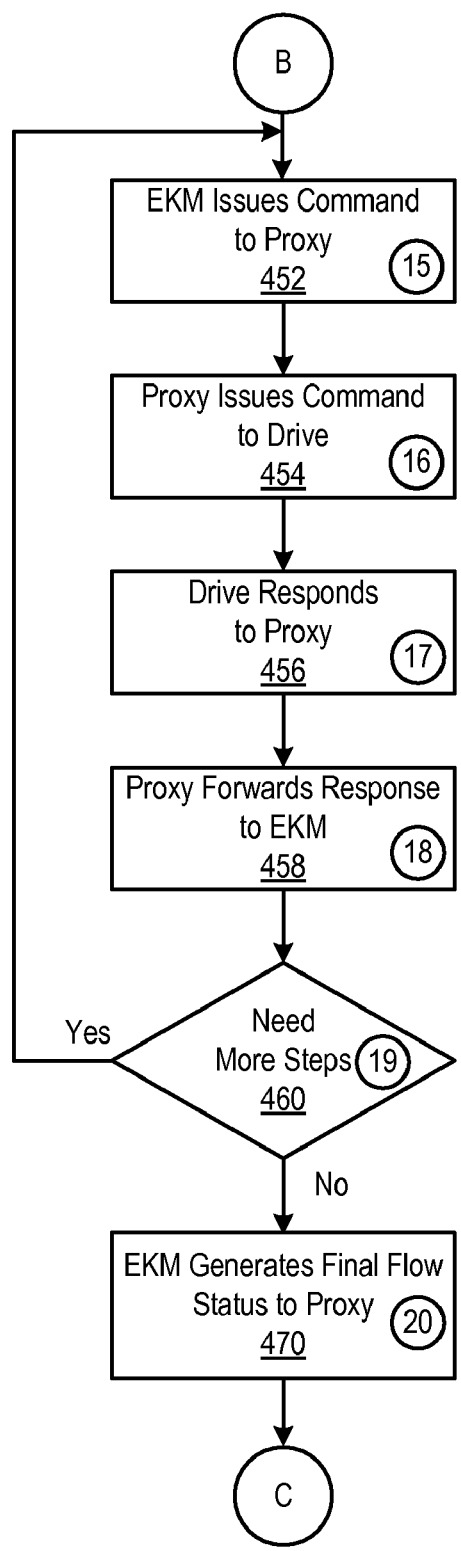
Figure 4D:
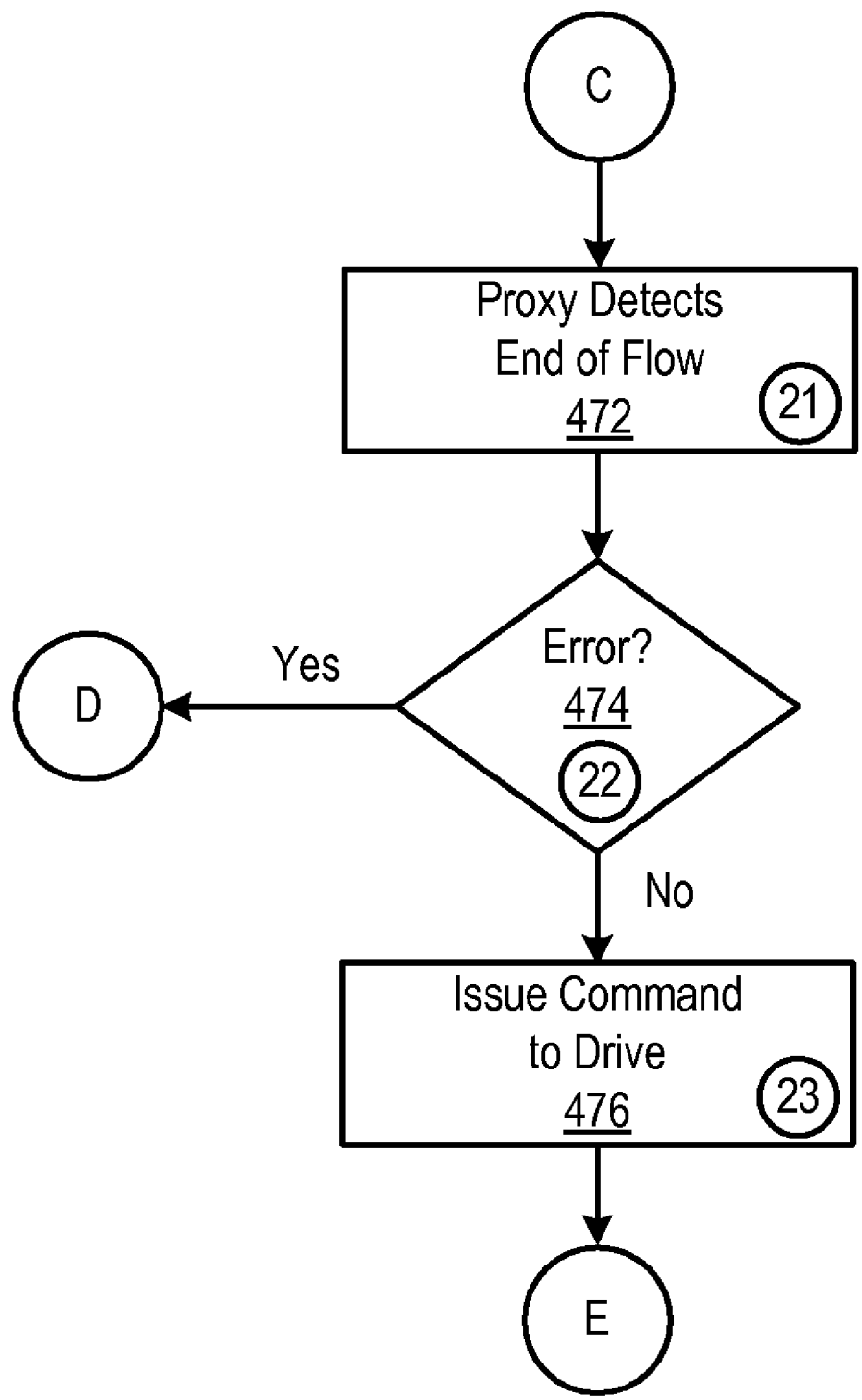

FIG. 3 shows a flow chart of the operation of the tape system 100 when performing an encrypted access. More specifically, the tape system performs a command initiation operation 310, an encryption key management operation 312 between the tape drive 110 and the EKM 116, and a command execution operation 314. The command initiation operation 310 generates a command that is provided to the device driver 120. The encryption key management operation 312 includes determining whether encryption is present (or desired) on the tape cartridge 114 at step 320, performing an encryption related function at step 322 and determining whether the encryption related function is complete at step 324. When the encryption related function is complete, the command that was generated at the command initiation operation 310 is executed by the command execution operation 314.

More specifically, during the command initiation operation 310, an access is initiated when the application 124 attempts to access the tape drive 112. The application 124 accesses the tape drive 112 via the device driver 120. The encryption capable device driver 120 causes a command (e.g., a Read or Write command) to be sent to the tape drive 112.

During the encryption operation 312, the tape drive 112 responds with a message that is intended for a key manager such as the EKM 116 at step 314. The encryption capable device driver 120 recognizes that this is a message intended for the EKM 116 at step 320. During step 322, the device driver 120 forwards that message to the EKM 116 (e.g., via an Internet Protocol (IP) connection). The EKM 116 then responds to the key request by issuing a new key (for a new cartridge which is to be written from beginning of tape (BOT)) or an existing key (for a cartridge which needs to be read). The device driver 120 continues the interaction between the tape drive 112 and the EKM 116 during step 322 determines whether all EKM responses to the encryption capable tape drive 112 and the EKM 116 from which the encryption capable tape drive obtains its keys at step 324. Once the tape drive has obtained all keys, the proxy 116 then issues an encryption function message to the device driver 120 which then causes the command to be execute at step 314.

Next after the command execution operation at step 314, the device driver 120 then communicates this Command Complete information to the host application 124. Application data then begins to flow between the drive and the application. (To the tape drive in the case of a write and from the tape drive in the case of a read.) The device driver 120 functions as a communication path between the application and the device driver for normal (i.e., non-encryption related) commands. The device driver 120 also detects extended commands intended for the EKM and provides this communication path separately. Thus, the encryption capable device driver 120 allows the tape system 100 to have an in-band communications path (i.e., a communications path between the device driver and the tape drive) and an out-of-band communications path (i.e., a communications path between the device driver and the EKM).

Figure 5:
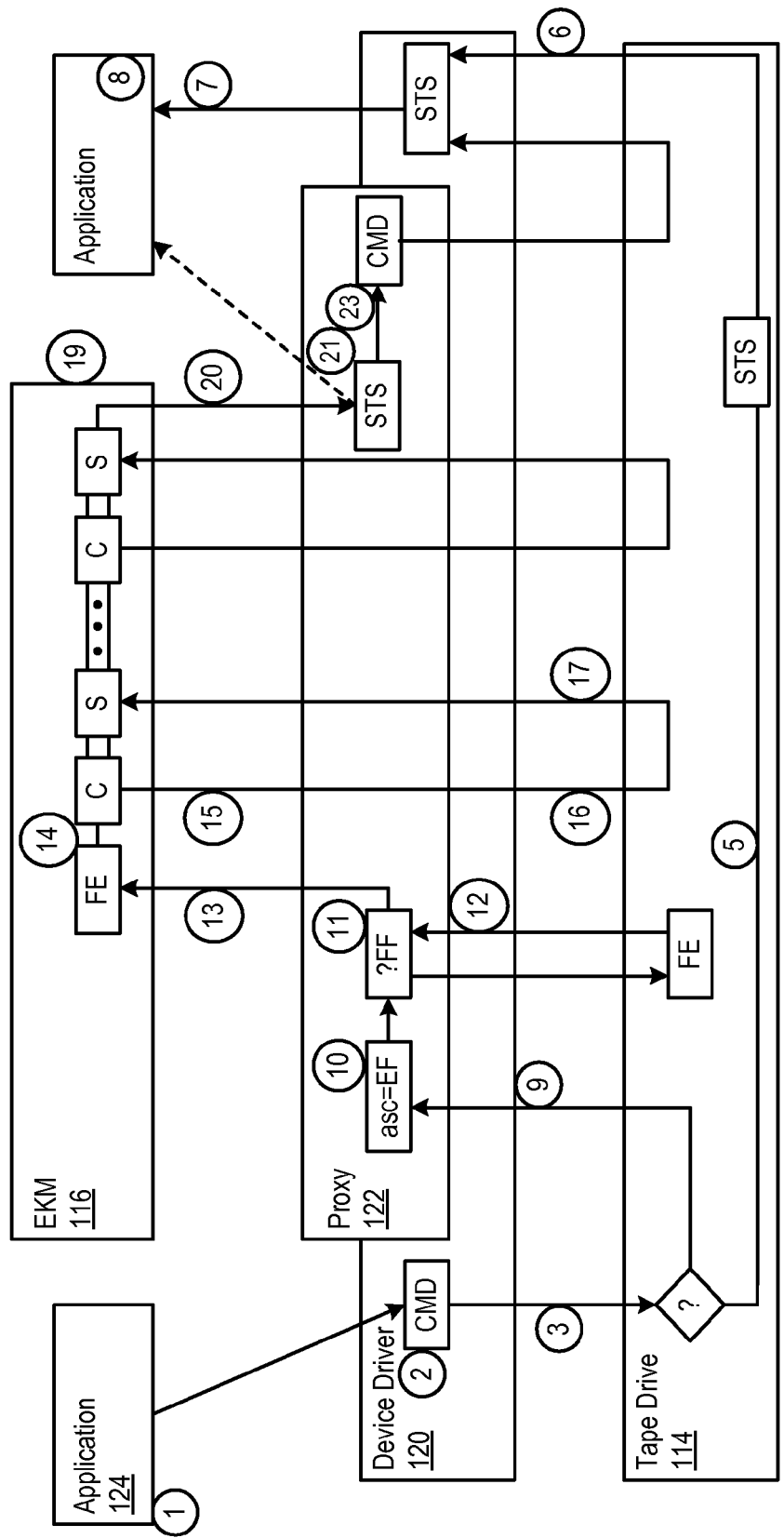
FIG. 5 shows a schematic block diagram illustrating a representative tape storage system and flow paths for a key manager pull method.

Referring now to FIGS. 4 and 5, FIG. 4 shows a flow chart illustrating the operation of the tape storage system a key manager pull method and FIG. 5 shows a schematic block diagram illustrating a representative tape storage system and flow paths for a key manager pull method. To better illustrate the correspondence of the steps of the flow chart with the flow paths of the tape storage system, the numbers represented within circles on the FIG. 4 flow chart correspond to the same numbers within circles on the FIG. 5 block diagram.

The method starts when an application (e.g., application 124) issues a tape command (CMD) at step 410. When a command is issued by the application 124, the command is actually issued to the tape drive driver 120. Next the driver 120 issues the command to the tape drive at step 412. When the tape drive receives this command at step 414, the tape drive reviews this command to determine whether the command is encryption related and needs to communicate with the EKM 116 (i.e., is encryption information needed to execute the command) at step 416.

If the command does not require an encryption related exchange with the EKM 116, then the tape drive 112 performs the command at step 420 and returns a status indication (STS) to the device driver 120 at step 422. The device driver 120 the reviews the status indication at step 424. If the status indication is not special (i.e., the command is not encryption related and has been completed), then the status is forwarded to the application at step 426 which then checks the status indication to assure that the command has been executed at step 428 and then returns control to the application to issue another command if desired.

If the command requires an encryption related exchange with the EKM 116, then the tape drive 112 returns a special status indication to the device driver 120 at step 430. (E.g., in certain embodiments, the tape drive 112 returns a status indication that includes the hex values EF, which represents a vendor unique arbitrary encryption indication). The device driver 120 the reviews the status indication at step 424. If the status indication is special (i.e., the command is encryption related), then the device driver 120 sets aside the command for later processing at step 440 and calls the proxy 122. The proxy 122 queries the tape drive 112 for forwarding information at step 442. The drive 114 then builds an initial command for encryption and sends this command to the proxy 122 via the driver 120 at step 444. The proxy 122 then opens a connection with the EKM 116 and sends the command to the EKM 116 at step 446. (In certain embodiments, the connection between the drive 112 and the EKM 116 may be via a TCP/IP socket that is either already present or is established by the proxy 122.)

The EKM 116 then parses the command at step 450. Next the EKM issues an encryption command to the proxy 122 at step 452. The proxy then issues the command to the drive 112 at step 454. The drive processes the command and then responds to the proxy at step 456. The proxy 122 forwards the drive response to the EKM 116 at step 458. The EKM 116 analyzes the response to determine whether more encryption steps are necessary at step 460 (i.e., has the encryption operation been completed). If further encryption steps are necessary, then the EKM returns to step 452 and issues another encryption command to the proxy 122. If no further encryption steps are necessary, then the EKM 116 generates a final flow status indication and forwards this status indication to the proxy at step 470. The proxy detects this final flow status indication at step 472 and determines whether an error is present at step 474. If an error is present (indicating that a problem occurred during the encryption operation), then the proxy forwards this status indication to the host application at step 410. If an error is not present, then the proxy 122 retrieves the command that was set aside at step 440 and issues this command to the drive 112 at step 476. The drive then receives the command at step 414 and proceeds to process the command. Because the encryption operation has been completed, the tape drive 112 should determine that an encryption related exchange is not required at step 416 and the command should be processed by step 420.

Figure 6A:
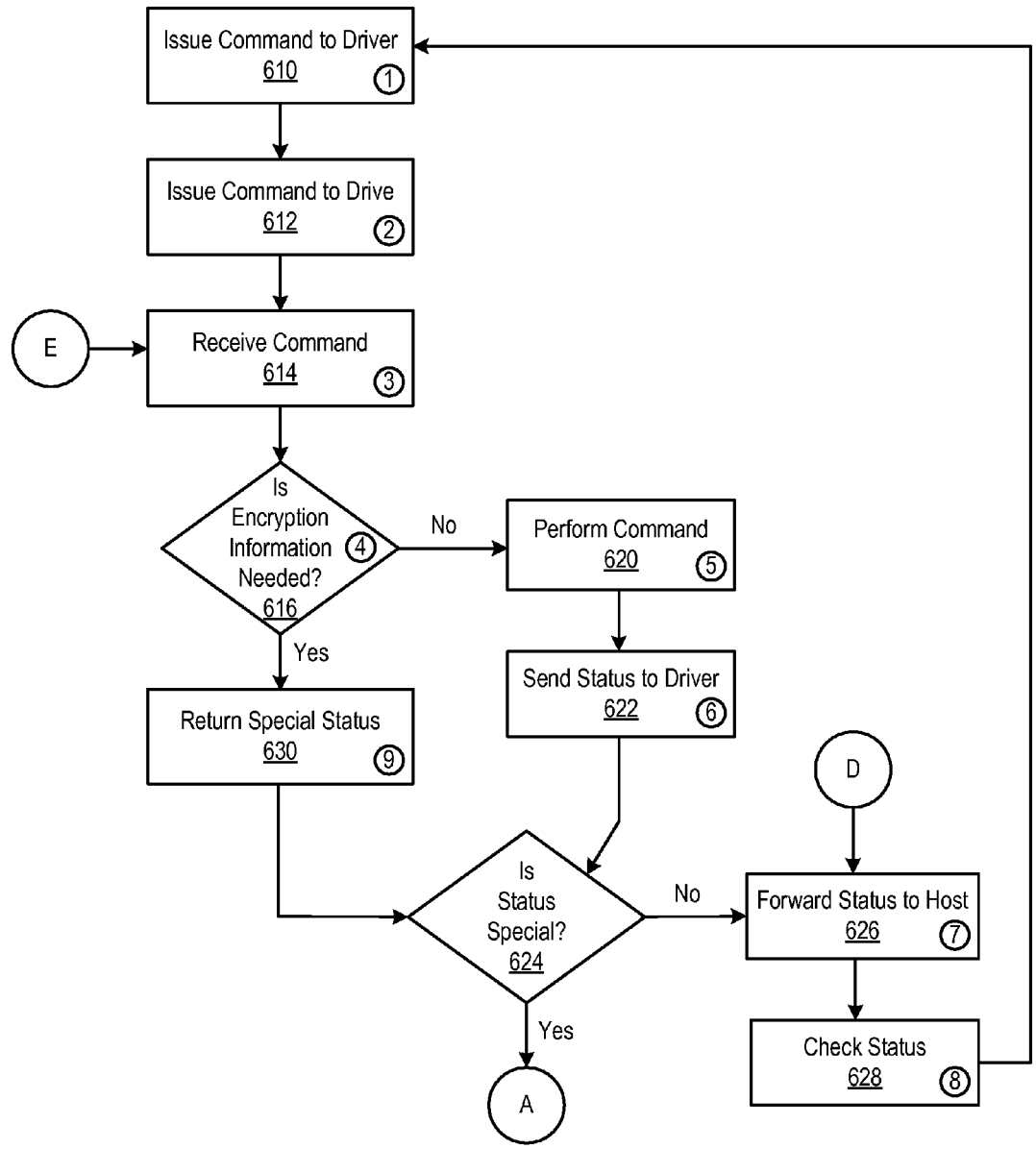
FIGS. 6A-6B, generally referred to as FIG. 6, show a flow chart of the operation of a tape system performing an encrypted access for a key manager push method.
Figure 6B:
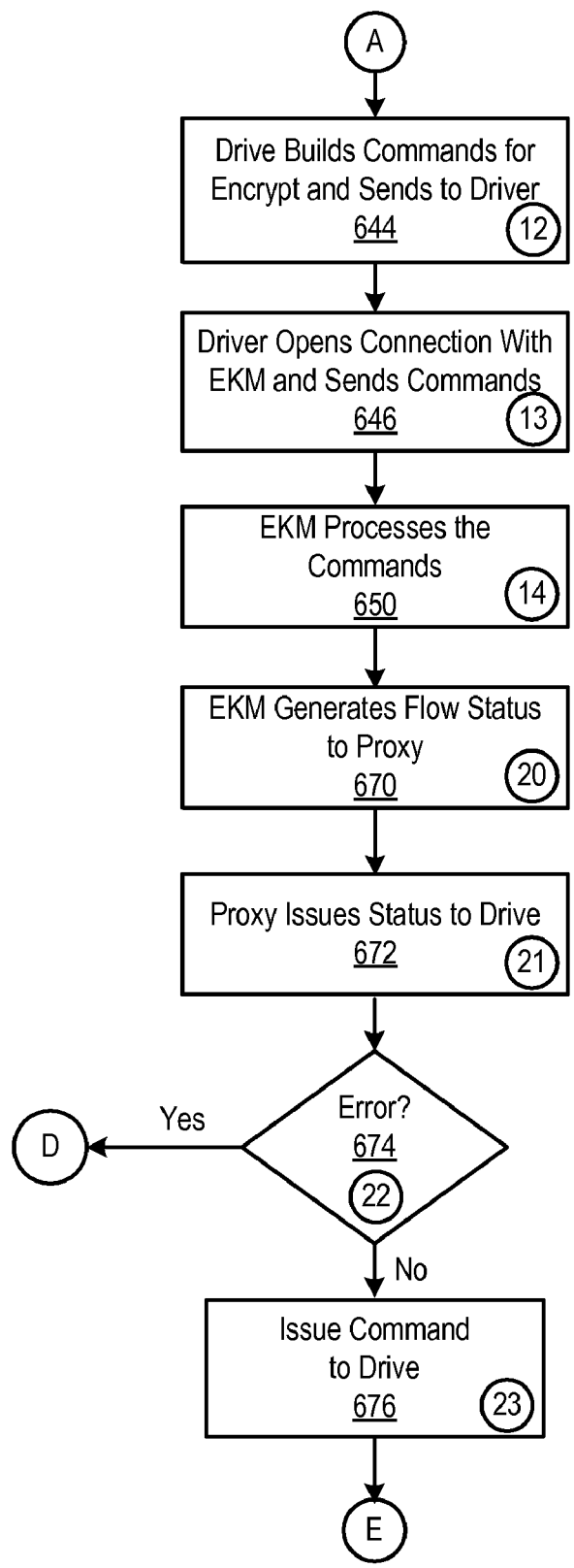
Figure 7:
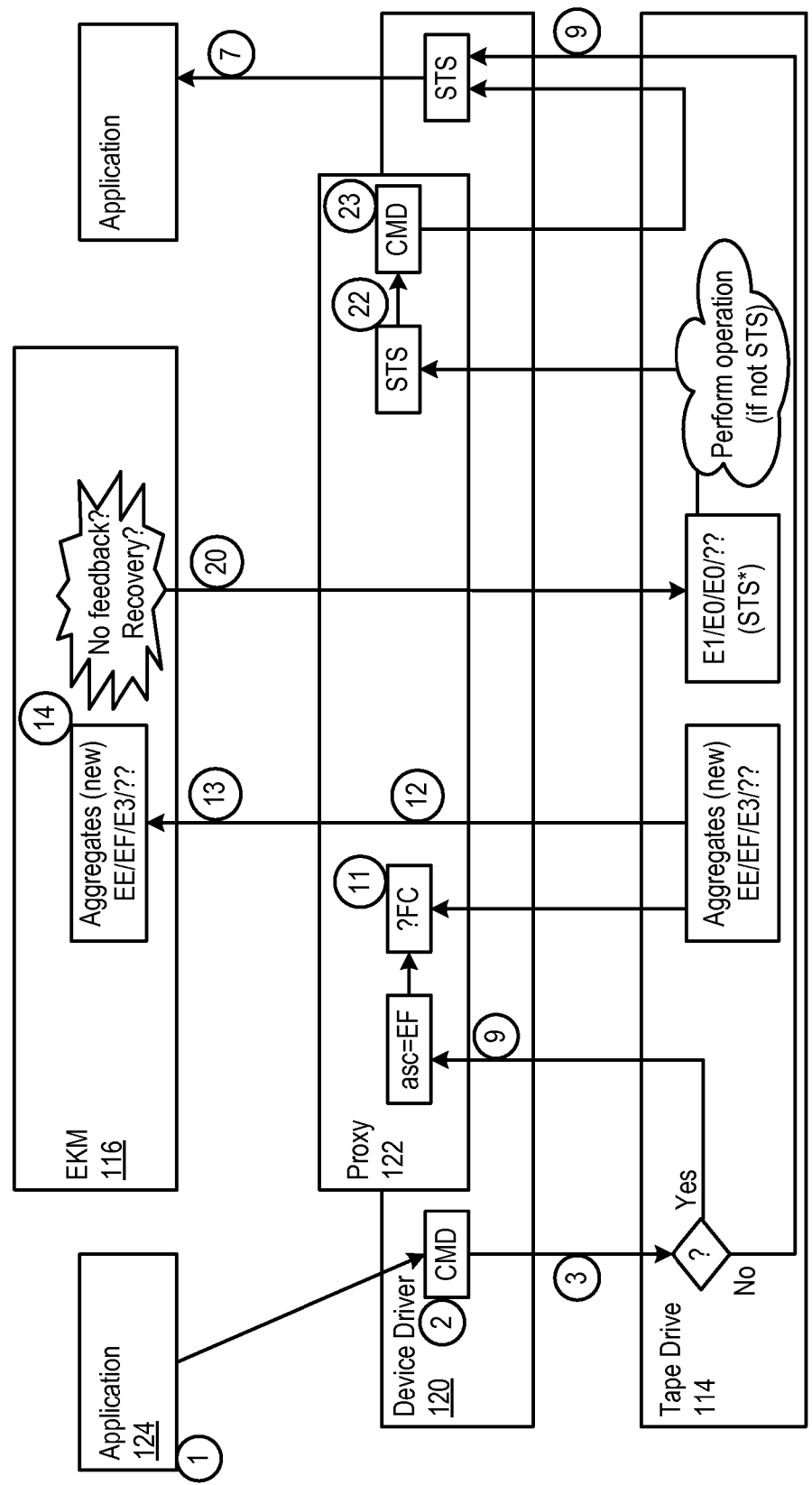
FIG. 7 shows a schematic block diagram illustrating a representative tape storage system and flow paths for a key manager push method.

Referring now to FIGS. 6 and 7, FIG. 6 shows a flow chart illustrating a operation of the tape storage system for a key manager push method and FIG. 7 shows a schematic block diagram illustrating a representative tape storage system and flow paths for a key manager push method. To better illustrate the correspondence of the steps of the flow chart with the flow paths of the tape storage system, the numbers represented within circles on the FIG. 6 flow chart correspond to the same numbers within circles on the FIG. 7 block diagram.

The method starts when an application (e.g., application 124) issues a tape command (CMD) at step 610. When a command is issued by the application 124, the command is actually issued to the tape drive driver 120. Next the driver 120 issues the command to the tape drive at step 612. When the tape drive receives this command at step 614, the tape drive reviews this command to determine whether the command is encryption related and needs to communicate with the EKM 116 (i.e., is encryption information needed to execute the command) at step 616.

If the command does not require an encryption related exchange with the EKM 116, then the tape drive 112 performs the command at step 620 and returns a status indication (STS) to the device driver 120 at step 622. The device driver 120 the reviews the status indication at step 624. If the status indication is not special (i.e., the command is not encryption related and has been completed), then the status is forwarded to the application at step 626 which then checks the status indication to assure that the command has been executed at step 628 and then returns control to the application to issue another command if desired.

If the command requires an encryption related exchange with the EKM 116, then the tape drive 112 returns a special status indication to the device driver 120 at step 630. (E.g., in certain embodiments, the tape drive 112 returns a status indication that includes the hex values EF, which represents a vendor unique arbitrary encryption indication). The device driver 120 the reviews the status indication at step 624. If the status indication is special (i.e., the command is encryption related), then the device driver 120 sets aside the command for later processing at step 640 and calls the proxy 122.

The proxy queries the tape drive 112 for forwarding information at step 642. The drive 112 then builds all of the commands necessary for encryption and sends these commands to the proxy 122 via the driver 120 at step 644.

The proxy 122 then opens a connection with the EKM 116 and sends the commands to the EKM 116 at step 646. (In certain embodiments, the connection between the drive 112 and the EKM 116 may be via a TCP/IP socket that is either already present or is established by the proxy 122.)

The EKM 116 then processes the encryption commands at step 650. Next the EKM issues a flow status indication to the proxy 122 at step 670. The proxy detects this flow status indication at step 672 and determines whether an error is present at step 674. If an error is present (indicating that a problem occurred during the encryption operation), then the proxy forwards this status indication to the host application at step 626. If an error is not present, then the proxy 122 retrieves the command that was set aside at step 640 and issues this command to the drive 112 at step 676. The drive then receives the command at step 614 and proceeds to process the command. Because the encryption operation has been completed, the tape drive 112 should determine that an encryption related exchange is not required at step 616 and the command should be processed by step 620.

While the invention has been particularly shown and described with respect to preferred embodiments thereof, it will be understood by those skilled in the art that the foregoing and other changes in form and details may be made therein without departing from the spirit and scope of the invention.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, other storage devices can use a similar device driver mechanism. Also for example other tape driver architectures are contemplated. Also for example, while the device driver and proxy are set forth as separate modules, it will be appreciated that the device driver and proxy can be included within a single module. Also for example, it will be appreciated that other types of operations from other types of supplemental modules could be proxied via the device driver. Additionally, for example, the functions of tape drive 112 and tape cartridge 114 may be implemented in software commonly referred to as a virtual tape library. The virtual tape library software may communicate with host 110 and mimic the functions of a physical tape library, including the functions of reading from and writing to tape media of a tape drive. The virtual tape library software may reside on a separate computer system coupled to host 110. As another example, tape drive 112 and tape cartridge 114 may be included in a tape library.

Also, for example, the above-discussed embodiments include modules that perform certain tasks. The modules discussed herein may include script, batch, or other executable files. The modules may be stored on a machine-readable or computer-readable storage medium such as a disk drive. Storage devices used for storing modules in accordance with an embodiment of the invention may be magnetic tape, magnetic floppy disks, hard disks, or optical discs such as CD-ROMs or CD-Rs. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A storage system comprising:
   a host;
   a storage device coupled to the host, the storage device interacting with storage media to store and retrieve information from the storage media, the storage device comprising
      an encryption module, the encryption module enabling encryption and decryption of data stored on storage media; and,
   a device driver executing on the host, the device driver checking for encryption related information from the storage device, the encryption related information being generated in response to a command issued by the host, when encryption related information is present, the device driver facilitating encryption independent of whether the host is encryption enable;
   a key manager, the key manager serving keys to the storage device via the device driver; and,
   a proxy, the proxy establishing a communication path between the storage device and the key manager to facilitate serving keys to the storage device, wherein the encryption related information comprises a status indication issued by the storage device indicating that an encryption operation is needed to be performed before the command can be executed by the storage device.

2. The storage system of claim 1 wherein:
the keys are served to the storage device via a push method.

3. The storage system of claim 1 wherein:
the keys are served to the storage device via a pull method.

4. The storage system of claim 1 wherein:
the command is issued by an application executing on the host.

5. The storage system of claim 4 wherein:
the application comprises a backup program that transfers data to and from the storage device.

6. The storage system of claim 1 wherein:
the storage device comprises a tape drive.

7. A storage device for interacting with storage media to store and retrieve information from the storage media comprising:
   an encryption module, the encryption module enabling encryption and decryption of data stored on storage media; and,
   a controller coupled to the encryption module, the controller interacting with the encryption module to enable storage and retrieval of information to and from the storage media; and wherein
   the storage device receives information from and transmits information to a device driver, the device driver checking for encryption related information from the storage device, the encryption related information being generated by the storage device in response to a command issued by the host, when encryption related information is present, the device driver facilitating encryption independent of whether the host is encryption enabled; and wherein
   the device driver interacts with a key manager, the key manager serving keys to the storage device via the device driver; and,
   the device driver interacts with a proxy, the proxy establishing a communication path between the storage device and the key manager to facilitate serving keys to the storage device, wherein the encryption related information comprises a status indication issued by the storage device indicating that an encryption operation is needed to be performed before the command can be executed by the storage device.

8. The storage device of claim 7 wherein:
the keys are served to the storage device via a push method.

9. The storage device of claim 7 wherein:
the keys are served to the storage device via a pull method.

10. The storage device of claim 7 wherein:
the command is issued by an application executing on the host.

11. The storage device of claim 10 wherein:
the application comprises a backup program that transfers data to and from the storage device.

12. The storage device of claim 7 wherein:
the storage device comprises a tape drive.

13. A method for facilitating encryption between an encryption enabled storage device and a host, the method comprising:

issuing a command to the storage device;

intercepting encryption related information generated by the storage device in response to the command;

determining whether the encryption related information indicates that an encryption operation is needed to be performed before the command can be executed by the encryption enabled storage device;

performing an encryption operation independent of whether the host is encryption enabled when the encryption related information indicates that the encryption operation is needed; and, executing the command after the encryption operation has completed execution; and, establishing a communication path between the encryption enabled storage device and the key manager via a proxy to facilitate serving keys to the storage device; and wherein the intercepting is performed by an encryption enabled device driver; and, the device driver communicates with a key manager, the key manager serving keys to the encryption enabled storage device via the device driver, wherein the encryption related information comprises a status indication issued by the storage device.

14. The method of claim 13 wherein:

the keys are served to the encryption enabled storage device via a push method.

15. The method of claim 13 wherein:

the keys are served to the encryption enabled storage device via a pull method.

16. The method of claim 13 wherein:

the command is issued by an application executing on the host.

17. The method of claim 16 wherein:

the application comprises a backup program that transfers data to and from the encryption enabled storage device.

18. The method of claim 13 wherein:

the storage device comprises a tape drive.

* * * * *